A. RYDER.
UMBRELLA.
APPLICATION FILED APR. 3, 1914.
1,126,293.
Patented Jan. 26, 1915.
2 SHEETS—SHEET 2.
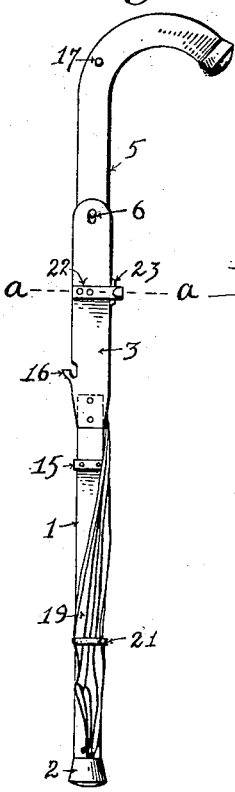
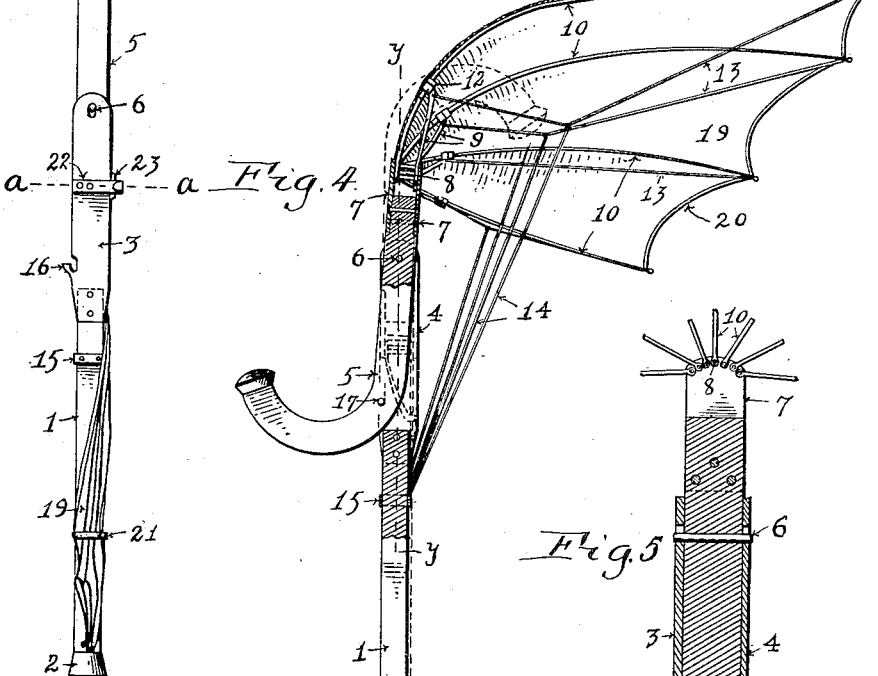
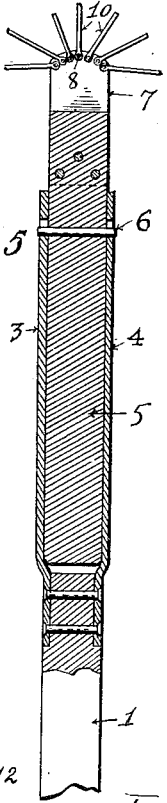
Inventor
Ambrose Ryder
by Wm Macomber
Attorney
Witnesses:—
Richard Sommer
A. W. Macomber

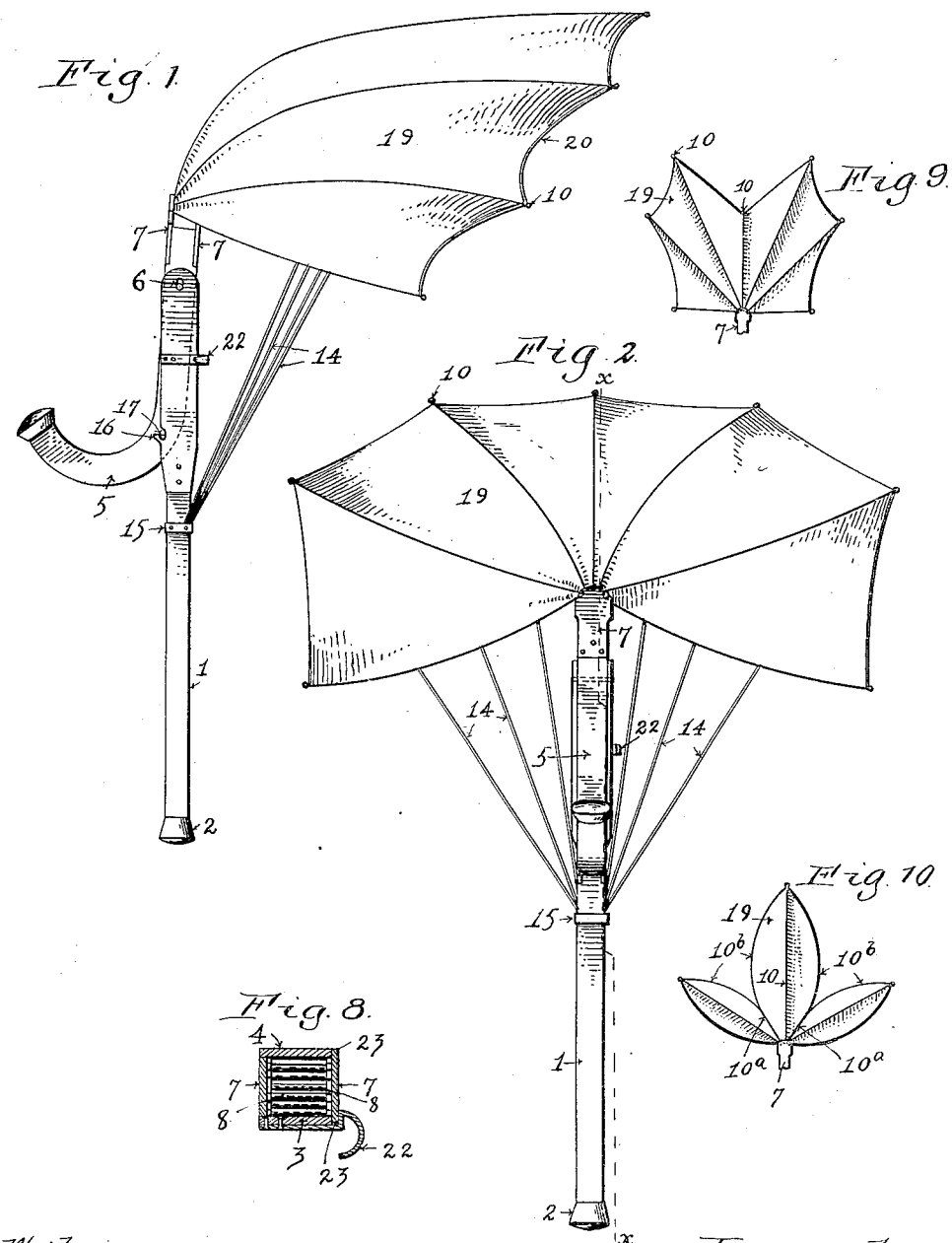

UNITED STATES PATENT OFFICE.

AMBROSE RYDER, OF CARMEL, NEW YORK.

UMBRELLA.

1,126,293.  Specification of Letters Patent.  Patented Jan. 26, 1915.

Application filed April 3, 1914. Serial No. 829,203.

*To all whom it may concern:*

Be it known that I, AMBROSE RYDER, a citizen of the United States, residing at Carmel, in the county of Putnam and State of New York, have invented a new and useful Umbrella, of which the following is a specification.

My invention relates to umbrellas, and more particularly to a new type of umbrella especially adapted to use as a sun-shade and to umbrellas of special and artistic form.

The object of my invention is to provide a simple, artistic umbrella, especially a sun-umbrella or sun-shade, which embodies, among other features, (1) a construction in which the covering or protective portion of the umbrella is located on one side of the axis of the stick or cane; (2) a folding construction wherein, when the umbrella is folded, it takes the form of a cane with a convenient and attractive handle; (3) a construction in which the contour and outline may be varied, giving numerous possibilities of artistic and unique form as distinguished from the plain, inartistic form of the ordinary umbrella; (4) a construction which dispenses with the long braces of the ordinary umbrella, and substitutes for the thrust action of such braces for giving tension and form to the protective portion the arrangement of cord tension herein shown—thus doing away with the common, annoying and destructive action of the ordinary braces which frequently become detached from the ribs and puncture the covering when the umbrella is attempted to be closed; and (5) securing the several other advantages which will be evident to one skilled in the art from the following specification and claims and from the annexed drawings having like characters of reference in which—

Figure 1 is a side elevation of my umbrella in the open or raised position. Fig. 2 is a front elevation in the same position. Fig. 3 is a side elevation of the same in the closed position. Fig. 4 is a section on the line $x$—$x$ of Fig. 2. Fig. 5 is an enlarged sectional detail on the line $y$—$y$ of Fig. 4. Fig. 6 is a detail perspective of the pivot connections of the stays or ribs. Fig. 7 is a section on the line $z$—$z$ of Fig. 6. Fig. 8 is a section on the line $a$—$a$ of Fig. 3. Figs. 9 and 10 are outlines or plans of fabric and arrangement of ribs on a smaller scale to show more clearly how my invention permits of the exercise of artistic construction.

The handle or stick 1 of the umbrella has its lower end capped or otherwise artistically finished, as shown at 2, and rigidly secured to its upper end are plates 3 and 4, within which the swinging handle 5 is slot-pivoted at 6.

Secured to one end of the swinging handle 5 are two plates, spaced apart, designated 7, 7, and carrying the pivot pins 8, 8, over which the stays or ribs 10, 10, and the trusses 9, 9, swing.

10, 10, are the stays or ribs made in any desirable form, but preferably of the same general form as an ordinary umbrella rib. The trusses 9 have loop-ends which take over the ribs 10 slidably between pins 11 and stops 12 on the ribs, which pins 11 limit the sliding movement as the umbrella is closed, and which stops 12 limit the sliding movement when the umbrella is raised. The positioning of the stops 12 upon the ribs 10 determine in large measure the curvature of the ribs 10 when the umbrella is raised, and are thus important in securing the desired contour effect in different forms and styles, as described.

Secured to the free ends of the ribs 10 and to the trusses 9 adjacent to the ends engaging over said ribs 10 are tension cords 13. Secured medially to these tension cords 13 at points which will give the desired curvature to the ribs 10 when the umbrella is raised are cords 14, the other ends of which are secured to the cane or stick 1 by a metal ring 15 or in other desired manner.

Upon the outer edges of the plates 3 and 4 are pin-slots 16, and the handle 5 has a pin 17 for engagement in said slots as hereafter described.

Secured either to the plate 7 or to the pins 8 extending therethrough, as shown, are springs 18 the free ends of which engage over the two outer ribs 10 and tend to force them together when the umbrella is closed. These springs assist in assuring the complete folding of the umbrella in the closed position. The ribs 10 are covered by and have secured to them any desired sort of fabric which constitutes the protective covering, and which may be reinforced by an edge-cord 20, or otherwise. A band or strap 21, of any desired form of construction, serves to hold the ribs and covering close to the stick. A spring clip 22 secured to the plate 3 engages the plate 7 when the umbrella is closed, and lugs or stops 23 on the plate 7 contact with the plates 3 and 4 and limit the swing of the handle 5 in the direction of closing.

The operation may now be described. When it is desired to raise the umbrella, the band or strap 21 is released, the spring clip 22 pressed out, and the handle 5 swung upon its pivot until the pin 17 strikes against the edges of the plates 3 and 4. A slight upward push on the stick 1 and a slight downward pull upon the handle 5 at the same time brings the pin 17 into the notch 16, and thus locks the umbrella in the raised position. As the umbrella is thus being raised, the cords 13 and 14 spread the ribs 10, producing the full lateral spread of the fabric 19, and the same cords 13 and 14 draw the ribs 10 to the desired degree of curvature. To close the umbrella, all that is necessary is to push up on the handle 5— the slot-pivot 6 permitting such movement— thus releasing the pin 17 from the notches 16; to swing the handle 5 upward until the spring clip 22 engages over the plate 7 when the lugs 23 contact with the plates 3 and 4, and to replace the strap 21.

Referring to Figs. 9 and 10, I have there shown how my improvement lends itself to various artistic form or outline. By giving the ribs 10 different lengths and by making the fabric the desired shape and securing it to said ribs, a leaf-form, such as shown in Fig. 9 may be secured. By employing special ribs, as 10ª, shown in Fig. 10, having the divided ends 10ᵇ and uniting the free ends of these bifurcated ribs to their respective adjacent standard ribs, and by making the covering the desired shape and securing the same to the ribs, a shamrock-form, such as shown in Fig. 10, may be made. These forms shown are merely illustrative of the adaptability of my invention.

Having thus described my invention, I claim:—

1. An umbrella comprising a stick, a swinging member pivoted thereto, a covering, ribs for supporting and spreading said covering, said ribs converging to a common point of support upon the margin of said covering and connected at that point to said swinging member, cords for tensioning said ribs and said covering which are attached to the free ends of said ribs and which have their other ends attached adjacent to the other ends of said ribs, and means for locking said swinging member to said stick when the umbrella is raised.

2. An umbrella comprising a stick, a swinging member pivoted thereto, a covering, ribs for supporting and spreading said covering, said ribs converging to a common point of support upon the margin of said covering and connected at that point to said swinging member, cords for tensioning said ribs and said covering which are attached to the free ends of said ribs and which have their other ends attached adjacent to the other ends of said ribs, cords attached medially to said tensioning cords and to said stick for further tensioning of said ribs and said cover, and means for locking said swinging member to said stick when the umbrella is raised.

3. An umbrella comprising a stick and a swinging member pivoted thereto, ribs pivotally secured to said swinging member, trusses pivoted to said swinging member engaging said ribs, cords for tensioning said ribs connecting the outer ends with points adjacent to their pivoted ends and cords connecting said first-mentioned cords with said stick and means for locking said swinging member in the raised position.

4. An umbrella comprising a stick and a swinging member pivoted thereto, ribs carried by said swinging member, trusses pivoted to said swinging member and engaging said ribs, springs for closing said ribs laterally, cords for tensioning said ribs secured to said stick and means for locking said swinging member to said stick in the raised position.

5. An umbrella comprising a stick and a swinging member pivoted thereto, ribs carried by said swinging member, trusses pivoted to said swinging member and engaging said ribs, springs for closing said ribs laterally, cords for tensioning said ribs, a slot-pivot between said stick and said swinging member and a pin-and-slot lock for securing the said swinging member in the raised position.

6. An umbrella comprising a stick and a swinging member pivoted thereto, ribs carried by said swinging member, trusses pivoted to said swinging member and engaging said ribs, springs for closing said ribs laterally, cords for tensioning said ribs, a slot pivot between said stick and said swinging member and a pin-and-slot lock for securing the said swinging member in the raised position, and a latch carried by said stick for locking said swinging member thereto when the umbrella is closed.

7. An umbrella having a protective covering and ribs converging to a point upon the periphery of the covering and comprising, in combination with the covering and ribs, a stick, a swinging member pivoted thereto, means for securing said ribs to said pivoted member and means for locking said pivoted member to said stick in the raised position.

8. An umbrella having a protective covering and ribs converging to a point upon the periphery of the covering and comprising, in combination with the covering and ribs, a stick, a swinging member pivoted thereto, means for securing said ribs to said swinging member, means for locking said pivoted member to said stick when in the raised position, and tensioning cords connecting said ribs with said stick to give the proper tension to said ribs and said covering.

9. An umbrella having a protective covering and ribs converging to a point upon the periphery of the covering and comprising, in combination with the covering and ribs, a stick, a swinging handle or member pivoted thereto, means for securing said ribs to said swinging member, trusses for supporting said ribs, a pin-and-slot for locking said swinging member in the raised position and tension cords connecting said ribs with said stick to give the covering and ribs the proper contour.

10. An umbrella having a protective covering and ribs converging to a point upon the periphery of the covering and comprising, in combination with the covering and ribs, a stick, a swinging member pivoted thereto, means for securing said ribs to said swinging member, trusses for supporting said ribs, springs acting upon the outer ribs to close the ribs and covering, a pin-and-slot for locking said swinging member in the raised position, and tension cords connecting said ribs with said stick to give the covering and ribs the proper contour.

11. An umbrella having a protective covering and ribs converging to a point upon the periphery of the covering and comprising, in combination with the covering and ribs, a stick, a swinging member pivoted to said stick which serves as a handle when the umbrella is closed, plates and pins on said swinging member connecting said ribs thereto, trusses for supporting said ribs, said trusses being pivoted to swing laterally only, springs acting upon the two outer ribs to close the ribs and covering, a pin-and-slot for locking said swinging member in the raised position, tension cords connecting said ribs with said stick to give the covering and ribs the proper contour, and a latch for locking the swinging member to said stick when the umbrella is in the closed position.

In testimony that I claim the foregoing invention I have hereunto set my hand in the presence of two witnesses.

AMBROSE RYDER.

Witnesses:
H. MYER RYDER,
STEPHEN RYDER.

Copies of this patent may be obtained for five cents each, by addressing the "Commissioner of Patents, Washington, D. C."